US010027577B2

United States Patent
Karandikar et al.

(10) Patent No.: US 10,027,577 B2
(45) Date of Patent: Jul. 17, 2018

(54) METHODS, SYSTEMS, AND COMPUTER READABLE MEDIA FOR PEER AWARE LOAD DISTRIBUTION

(71) Applicant: Oracle International Corporation, Redwood Shores, CA (US)

(72) Inventors: Vinit Prabhakar Karandikar, Coppell, TX (US); Komal Girdharkrishna Khungar, Cary, NC (US); Mark Edward Kanode, Apex, NC (US); Paul Sheer, Dallas, TX (US)

(73) Assignee: Oracle International Corporation, Redwood Shores, CA (US)

(*) Notice: Subject to any disclaimer, the term of this patent is extended or adjusted under 35 U.S.C. 154(b) by 185 days.

(21) Appl. No.: 14/813,072

(22) Filed: Jul. 29, 2015

(65) Prior Publication Data

US 2017/0034048 A1     Feb. 2, 2017

(51) Int. Cl.
| | |
|---|---|
| *G06F 15/173* | (2006.01) |
| *H04L 12/701* | (2013.01) |
| *H04L 12/725* | (2013.01) |
| *H04L 12/773* | (2013.01) |

(52) U.S. Cl.
CPC ............ *H04L 45/304* (2013.01); *H04L 45/60* (2013.01)

(58) Field of Classification Search
CPC ..... H04L 45/60; H04L 45/304; H04L 45/028; H04L 47/125; H04L 67/1002; H04L 67/1012; H04L 67/1025; H04L 65/80
USPC ........................................................ 709/238
See application file for complete search history.

(56) References Cited

U.S. PATENT DOCUMENTS

| | | |
|---|---|---|
| 5,278,890 A | 1/1994 | Beeson et al. |
| 5,926,482 A | 7/1999 | Christie et al. |
| 6,029,191 A | 2/2000 | Kurashima |
| 6,108,409 A | 8/2000 | Cooper et al. |

(Continued)

FOREIGN PATENT DOCUMENTS

| | | |
|---|---|---|
| CN | 1777143 A | 5/2006 |
| CN | 101136943 A | 3/2008 |

(Continued)

OTHER PUBLICATIONS

Letter regarding Decision to Grant for Chinese Application No. ZL201180013555.4 (dated Apr. 21, 2016).

(Continued)

*Primary Examiner* — Ruolei Zong
(74) *Attorney, Agent, or Firm* — Jenkins, Wilson, Taylor & Hunt, P.A.

(57) ABSTRACT

Methods, systems, and computer readable media for peer aware load distribution are disclosed. According to one method, the method includes steps occurring at a DSR comprising a plurality of message processors. The method also includes receiving Diameter messages associated with two or more Diameter sessions, wherein each of the two or more Diameter sessions is associated with a first peer group and assigning, using the first peer group and a peer aware load distribution algorithm, the two or more Diameter sessions to two or more message processors of the plurality of message processors, wherein the peer aware load distribution algorithm distributes Diameter sessions associated with the first peer group among the two or more message processors for avoiding a single point of failure.

20 Claims, 4 Drawing Sheets

(56) References Cited

U.S. PATENT DOCUMENTS

| | | | |
|---|---|---|---|
| 6,157,621 A | 12/2000 | Brown et al. | |
| 6,282,280 B1 | 8/2001 | Rekieta et al. | |
| 6,327,472 B1 | 12/2001 | Westroos et al. | |
| 6,515,985 B2 | 2/2003 | Shmulevich et al. | |
| 6,628,672 B1 | 9/2003 | Cabello | |
| 6,647,113 B2 | 11/2003 | McCann et al. | |
| 6,662,017 B2 | 12/2003 | McCann et al. | |
| 6,678,369 B2 | 1/2004 | DeMent et al. | |
| 6,760,343 B1 | 7/2004 | Krishnamurthy et al. | |
| 6,785,378 B2 | 8/2004 | Mar | |
| 6,788,774 B1 | 9/2004 | Caldwell et al. | |
| 6,826,198 B2 | 11/2004 | Turina et al. | |
| 6,901,262 B2 | 5/2005 | Allison et al. | |
| 6,944,184 B1 | 9/2005 | Miller et al. | |
| 6,965,567 B2 | 11/2005 | Ramos et al. | |
| 7,023,794 B2 | 4/2006 | Khan et al. | |
| 7,043,003 B1 | 5/2006 | Friedl | |
| 7,050,562 B2 | 5/2006 | Allison et al. | |
| 7,068,773 B2 | 6/2006 | McCann et al. | |
| 7,079,499 B1 | 7/2006 | Akhtar et al. | |
| 7,092,388 B2 | 8/2006 | Jarlstedt | |
| 7,092,505 B2 | 8/2006 | Allison et al. | |
| 7,127,057 B2 | 10/2006 | Delaney et al. | |
| 7,136,477 B2 | 11/2006 | Craig et al. | |
| 7,197,036 B2 | 3/2007 | Craig | |
| 7,222,192 B2 | 5/2007 | Allison et al. | |
| 7,257,215 B2 | 8/2007 | Angemayr et al. | |
| 7,260,086 B2 | 8/2007 | Delaney et al. | |
| 7,286,524 B1 | 10/2007 | Loftus | |
| 7,298,725 B2 | 11/2007 | Rune | |
| 7,372,953 B2 | 5/2008 | Delaney et al. | |
| 7,403,492 B2 | 7/2008 | Zeng et al. | |
| 7,440,472 B2 | 10/2008 | Delaney et al. | |
| 7,522,580 B2 | 4/2009 | Miller et al. | |
| 7,532,647 B2 | 5/2009 | Eichler et al. | |
| 7,554,974 B2 | 6/2009 | Palmer et al. | |
| 7,564,870 B2 | 7/2009 | Miller et al. | |
| 7,590,732 B2 | 9/2009 | Rune | |
| 7,633,969 B2 | 12/2009 | Caugherty et al. | |
| 7,760,706 B2 | 7/2010 | Delaney et al. | |
| 7,898,957 B2 | 3/2011 | Lea et al. | |
| 8,201,219 B2 | 6/2012 | Jones | |
| 8,369,313 B2 | 2/2013 | Lu et al. | |
| 8,423,678 B2 | 4/2013 | Darbyshire et al. | |
| 8,468,267 B2 | 6/2013 | Yigang et al. | |
| 8,478,828 B2 | 7/2013 | Craig et al. | |
| 8,483,233 B2 | 7/2013 | Craig et al. | |
| 8,504,630 B2 | 8/2013 | Craig et al. | |
| 8,578,050 B2 | 11/2013 | Craig et al. | |
| 8,799,391 B2 | 8/2014 | Craig et al. | |
| 8,817,627 B2 | 8/2014 | Delaney et al. | |
| 8,879,431 B2 | 11/2014 | Ridel et al. | |
| 8,958,306 B2 | 2/2015 | McCann et al. | |
| 9,088,478 B2 | 7/2015 | Craig et al. | |
| 9,729,454 B2 | 8/2017 | Zaidi et al. | |
| 2001/0029182 A1 | 10/2001 | McMann et al. | |
| 2001/0055380 A1 | 12/2001 | Benedyk et al. | |
| 2002/0069278 A1 | 6/2002 | Forslöw | |
| 2002/0116522 A1 | 8/2002 | Zelig | |
| 2002/0141346 A1 | 10/2002 | Garcia-Luna-Aceves et al. | |
| 2002/0176430 A1 | 11/2002 | Sangha et al. | |
| 2002/0186702 A1 | 12/2002 | Ramos et al. | |
| 2003/0061234 A1 | 3/2003 | Ali et al. | |
| 2003/0108067 A1 | 6/2003 | Craig et al. | |
| 2003/0115358 A1 | 6/2003 | Yun | |
| 2003/0169779 A1 | 9/2003 | Craig | |
| 2004/0037278 A1 | 2/2004 | Wong et al. | |
| 2004/0081206 A1 | 4/2004 | Allison et al. | |
| 2004/0203849 A1 | 10/2004 | Allison et al. | |
| 2004/0240658 A1 | 12/2004 | Delaney et al. | |
| 2004/0264675 A1 | 12/2004 | Delaney et al. | |
| 2005/0013290 A1 | 1/2005 | Allison et al. | |
| 2005/0047401 A1 | 3/2005 | Garnero et al. | |
| 2005/0111442 A1 | 5/2005 | Delaney et al. | |
| 2005/0120095 A1 | 6/2005 | Aman et al. | |
| 2005/0232407 A1 | 10/2005 | Craig et al. | |
| 2005/0235065 A1 | 10/2005 | Le et al. | |
| 2006/0013264 A1 | 1/2006 | Eichler et al. | |
| 2006/0067503 A1 | 3/2006 | Caugherty et al. | |
| 2006/0101159 A1* | 5/2006 | Yeh | H04L 45/00 709/246 |
| 2007/0180113 A1 | 8/2007 | Van Bemmel | |
| 2008/0013446 A1 | 1/2008 | Xu et al. | |
| 2008/0043614 A1 | 2/2008 | Soliman | |
| 2008/0127232 A1 | 5/2008 | Langen et al. | |
| 2009/0041043 A1 | 2/2009 | Belling et al. | |
| 2009/0083861 A1 | 3/2009 | Jones | |
| 2010/0299451 A1 | 11/2010 | Yigang et al. | |
| 2011/0116382 A1 | 5/2011 | McCann et al. | |
| 2011/0199906 A1 | 8/2011 | Kanode et al. | |
| 2011/0200053 A1 | 8/2011 | Kanode et al. | |
| 2011/0200054 A1* | 8/2011 | Craig | H04L 63/0892 370/401 |
| 2011/0202604 A1* | 8/2011 | Craig | H04L 63/0892 709/205 |
| 2011/0202612 A1 | 8/2011 | Craig et al. | |
| 2011/0202613 A1 | 8/2011 | Craig et al. | |
| 2011/0202614 A1 | 8/2011 | Craig et al. | |
| 2011/0202676 A1 | 8/2011 | Craig et al. | |
| 2011/0202677 A1 | 8/2011 | Craig et al. | |
| 2011/0202684 A1 | 8/2011 | Craig et al. | |
| 2011/0314178 A1 | 12/2011 | Kanode et al. | |
| 2012/0158872 A1* | 6/2012 | McNamee | H04L 69/40 709/206 |
| 2012/0191847 A1* | 7/2012 | Nas | H04L 63/0227 709/224 |
| 2012/0221899 A1* | 8/2012 | Cervenak | G06Q 10/10 714/48 |
| 2012/0226758 A1* | 9/2012 | Sprague | H04L 63/0892 709/206 |
| 2013/0064093 A1* | 3/2013 | Ridel | H04L 47/125 370/236 |
| 2013/0094362 A1 | 4/2013 | Qiu et al. | |
| 2013/0322430 A1 | 12/2013 | Mann | |
| 2013/0329740 A1 | 12/2013 | Wallace et al. | |
| 2013/0346549 A1 | 12/2013 | Craig et al. | |
| 2014/0237111 A1 | 8/2014 | McMurry et al. | |
| 2014/0304415 A1 | 10/2014 | Prakash et al. | |
| 2014/0348176 A1* | 11/2014 | Sprague | H04L 49/35 370/401 |
| 2016/0191631 A1 | 6/2016 | Haraszti et al. | |
| 2016/0212052 A1 | 7/2016 | Zaidi et al. | |

FOREIGN PATENT DOCUMENTS

| | | |
|---|---|---|
| CN | 101150512 A | 3/2008 |
| CN | 101588606 A | 11/2009 |
| CN | ZL 201180018814.2 | 2/2011 |
| CN | ZL 201180013681 | 6/2015 |
| CN | 102893556 B | 8/2016 |
| EP | 1 134 939 A1 | 9/2001 |
| EP | 2 534 790 B1 | 4/2016 |
| JP | H0537596 | 2/1993 |
| WO | WO 2000/60812 | 10/2000 |
| WO | WO 2005/052743 | 6/2005 |
| WO | WO 2006/036500 | 4/2006 |
| WO | WO 2008/105976 | 9/2008 |
| WO | WO 2009/042062 A2 | 4/2009 |
| WO | WO 2009/070179 A1 | 6/2009 |
| WO | WO 2009/128837 A1 | 10/2009 |
| WO | WO 2011/00594 | 8/2011 |
| WO | WO 2011/100587 | 8/2011 |
| WO | WO 2011/100603 | 8/2011 |

OTHER PUBLICATIONS

Letter regarding Decision to Grant for European Application No. 11742901.9 (dated Apr. 1, 2016).

Letter regarding Notification to Grant for Chinese Patent Application No. ZL201180018814.2 (dated Jul. 20, 2015).

Extended European Search Repot for European Application No. 11742906.8 (dated Jun. 26, 2015).

(56) References Cited

OTHER PUBLICATIONS

Letter regarding Decision to Grant for Chinese Patent Application No. ZL201180013681.X (dated Apr. 13, 2015).
Second Office Action for Chinese Patent Application No. 201180013555.4 (dated Mar. 20, 2015).
Letter regarding Notice Before Examination for Israel Patent Application No. 221424 (dated Jan. 11, 2015).
First Office Action for Chinese Patent Application No. 201180018814.2 (dated Oct. 30, 2014).
First Office Action for Chinese Application No. 201180013681.X (dated Aug. 18, 2014).
First Office Action for Chinese Patent Application No. 201180013555.4 (dated Jul. 3, 2014).
Notice of Allowance for U.S. Appl. No. 12/797,197 dated May 21, 2014.
Notice of Allowance and Fee(s) Due for U.S. Appl. No. 13/932,608 (dated Apr. 9, 2014).
Final Office Action for U.S. Appl. No. 12/797,197 dated Jan. 27, 2014.
"Diameter Interface Support," Chapter 2, Cisco Service Control Mobile Solution Guide, http://www.cisco.com/c/en/us/td/docs/cable/serv_exch/serv_control/broadband_app/rel41x/mobile_sol/mobile_sol/02_mobile_diameter.pdf, pp. 2-1-2-8 (Dec. 23, 2014).
Extended European Search Report for European Application No. 11742894.6 (dated Dec. 3, 2013).
"IP Front End (IPFE) User Guide," Eagle® XG Diameter Signaling Router, 910-6826-001 Revision A, pp. 1-29 (Nov. 2013).
Non-Final Office Action for U.S. Appl. No. 12/797,197 dated Jul. 3, 2013.
Commonly-Assigned, Co-Pending U.S. Appl. No. 13/932,608 titled "Methods, Systems, and Computer Readable Media for Inter-Diameter-Message Processor Routing," (unpublished, filed Jul. 1, 2013).
Notice of Allowance and Fee(s) Due for U.S. Appl. No. 13/026,076 (dated Jun. 27, 2013).
Notice of Allowance and Fee(s) Due for U.S. Appl. No. 13/026,031 (dated May 30, 2013).
Supplemental Notice of Allowability for U.S. Appl. No. 13/026,031 (dated Mar. 22, 2013).
Notice of Allowance and Fee(s) Due for U.S. Appl. No. 13/025,968 (dated Feb. 27, 2013).
Final Office Action for U.S. Appl. No. 12/797,197 dated Feb. 11, 2013.
Notice of Allowance and Fee(s) Due for U.S. Appl. No. 13/026,031 (dated Jan. 30, 2013).
Final Official Action for U.S. Appl. No. 13/026,076 (dated Dec. 7, 2012).
Communication of European Publication Number and Information on the Application of Article 67(3) EPC for European Patent Application No. 11742906.8 (dated Nov. 21, 2012).
Communication of European Publication Number and Information on the Application of Article 67(3) EPC for European Patent Application No. 11742901.9 (dated Nov. 21, 2012).
Communication of European Publication Number and Information on the Application of Article 67(3) EPC for European Patent Application No. 11742894.6 (dated Nov. 21, 2012).
Fajardo et al., "Diameter Base Protocol," RFC 6733, pp. 1-152 (Oct. 2012).
Non-Final Office Action for U.S. Appl. No. 12/797,197 dated Jul. 9, 2012.
Non-Final Official Action for U.S. Appl. No. 13/026,076 (dated Jun. 4, 2012).
Notification of Transmittal of the International Search Report and the Written Opinion of the International Searching Authority, or the Declaration for International Application No. PCT/US2011/024614 (dated Oct. 31, 2011).
Notification of Transmittal of the International Search Report and the Written Opinion of the International Searching Authority, or the Declaration for International Application No. PCT/US2011/024601 (dated Oct. 20, 2011).
Notification of Transmittal of the International Search Report and the Written Opinion of the International Searching Authority, or the Declaration for International Application No. PCT/US2011/024588 (dated Oct. 20, 2011).
Communication pursuant to Article 94(3) EPC for European Application No. 04 811 530.7 (dated Feb. 11, 2011).
Notice of Allowance for U.S. Appl. No. 10/993,738 dated Jun. 25, 2010.
Commonly-assigned, co-pending U.S. Appl. No. 12/797,197 for "Methods and Systems for Message Transfer Part (MTP) Load Sharing Using MPT Load Sharing Groups", (Unpublished, filed Jun. 9, 2010).
Notice of Allowance for U.S. Appl. No. 10/993,738 dated Mar. 5, 2010.
"Traffix Diameter Gateway; Instant Diameter Connection to any Network Element," Traffix Systems, pp. 1-4 (Publication Date Unknown) (Downloaded from the Internet on Feb. 8, 2010).
"Traffix Diameter Load Balancer; Scaling the Diameter Control Plane," Traffix Systems, pp. 1-4 (Publication Date Unknown) (Downloaded from the Internet on Feb. 8, 2010).
"Next Generation Networks Load Balancing—The Key to NGN Control, Management, and Growth," Whitepaper by Traffix Systems, pp. 1-7 (Publication Date Unknown) (Downloaded from the Internet on Feb. 8, 2010).
"Universal Mobile Telecommunications Systems (UMTS); LTE: InterWorking Function (IWF) Between MAP Based and Diameter Based interfaces (3GPP TS 29.305 Version 9.0.0 Release 9)," ETSI TS 129 305 V9.0.0 (Jan. 2010).
"Digital Cellular Telecommunications System (Phase 2+); Universal Mobile Telecommunications System (UMTS); LTE; IP Multimedia (IM) Subsystem Cx and Dx Interfaces; Signalling Flows and Message Contents (3GPP TS 29.228 Version 8.7.0 Release 8)," ETSI TS 129 228 v8.7.0 (Jan. 2010).
Jones et al., "Diameter Extended NAPTR," Individual Submission Internet-Draft, draft-ietf-dime-extended-naptr-00, pp. 1-9 (Dec. 29, 2009).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
Jiao et al., "The Diameter Capabilities Update Application," Network Working Group Internet-Draft draft-ietf-dime-capabilities-update-01, pp. 1-8 (Dec. 1, 2009).
Supplemental Notice fo Allowability for U.S. Appl. No. 11/147,144 (dated Nov. 17, 2009).
Tsou et al., "Realm-Based Redirection in Diameter," Internet Engineering Task Force, draft-ietf-dime-realm-based-redirect-02, pp. 1-7 (Oct. 27, 2009).
Huang et al., "The Diameter Precongestion Notification (PCN) Data Collection Applications," Network Working Group Internet-Draft <draft-huang-dime-pcn-collection-02>, pp. 1-19 (Oct. 26, 2009).
Carlberg et al., "Diameter Priority Attribute Value Pairs," Diameter Maintenance and Extensions (DIME) Internet-Draft <draft-carlberg-dime-priority-avps-00.txt>, pp. 1-6 (Oct. 19, 2009).
Korhonen et al., "Diameter User-Name and Realm Based Request Routing Clarifications," Diameter Maintenance and Extensions (DIME) Internet-Draft, draft-ietf-dime-nai-routing-04.txt, pp. 1-13 (Oct. 6, 2009).
Fajardo et al., "Diameter Base Protocol," DIME Internet-Draft, draft-ietf-dime-rfc3588bis-19.txt, pp. 1-160 (Sep. 2, 2009).
Notice of Allowance and Fee(s) Due for U.S. Appl. No. 11/147,144 (dated Aug. 17, 2009).
Tsou et al., "Session-Spectific Explicit Diameter Request Routing," Network Working Group Internet-Draft, draft-tsou-diameter-explicit-routing-03, pp. 1-18 (Aug. 5, 2009).
Non-Final Office Action for U.S. Appl. No. 10/993,738 dated Jul. 16, 2009.
Official Action for U.S. Appl. No. 11/147,144 (dated Jul. 7, 2009).
Bhardwaj, "Roaming Hubbing & LTE," GSMA London, pp. 1-11 (May 19, 2009).
Matijašević et al., "Mechanisms for Diameter service performance enhancement," http://www.mrtc.mdh.se/qimpress/files/SoftCOM_DMatijasevic.pdf, pp. 1-5 (2009).

(56) References Cited

OTHER PUBLICATIONS

Non-Final Office Action for U.S. Appl. No. 10/993,733 dated Nov. 13, 2008.
Official Action for U.S. Appl. No. 11/147,144 (dated Nov. 13, 2008).
Tsou et al., "Diameter Routing Extensions," draft-tsou-dime-base-routing-ext-04, Internet-Draft, pp. 1-28 (Jul. 29, 2008).
Notification of Transmittal of the International Search Report and the Written Opinion of the International Searching Authority, or the Declaration for International Application No. PCT/US05/32070 (dated Jul. 11, 2008).
Supplementary European Search Report for European Patent Application No. 04811530.7-1249 (dated Apr. 15, 2008).
Non-Final Office Action for U.S. Appl. No. 10/993,738 dated Feb. 5, 2008.
Notification of European publication Number and information on the application of Article 67(3) EPC for European Application No. 04811530.7 (dated Aug. 9, 2006).
Notification of Transmittal of the International Search Report and the Written Opinion of the International Searching Authority, or the Declaration for International Application No. PCT/US2004/38827 (dated Jul. 11, 2006).
Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).
Eronen et al., "Diameter Extensible Authentication Protocol (EAP) Application," Network Working Group, RFC 4072, pp. 1-31 (Aug. 2005).
Calhoun et al., "Diameter Base Protocol," Network Working Group, RFC 3588, pp. 1-148 (Sep. 2003).
Sidebottom et al., "Signaling System 7 (SS7) Message Transfer Part 3 (MTP3)—User Adaptation Layer (M3UA)," RFC 3332, pp. 1-113 (Sep. 2002).
Stewart et al., "Stream Control Transmission Protocol," Network Working Group RFC 2960, pp. 1-134 (Oct. 2000).
Greene et al., "Bi-Directional Session Setup Extension to Diameter," Internet Draft <draft-greene-diameter-ss7-session-00.txt>, pbs. 1-12 (Jul. 1998).
Jabbari, "Routing and Congestion Control in Common Channel Signaling System No. 7", Proceedings of the IEEE, vol. 80, No. 4, pp. 607-617 (Apr. 1992).
Non-Final Office Action for U.S. Appl. No. 14/601,906 (dated Sep. 30, 2016).
Letter regarding Certificate of Patent for Israeli Patent Application No. 221424 (dated Jul. 1, 2016).
Notification of the First Office Action for Chinese Patent Application No. 201510317392.9 (dated Jun. 20, 2017).
Notice of Allowance and Fee(s) due for U.S. Appl. No. 14/601,906 (dated Mar. 31, 2017).
Communication pursuant to Article 94(3) EPC corresponding to European Application No. 11 742 894.6 (dated Dec. 2, 2016).
Communication pursuant to Article 94(3) EPC for European Application No. 11 742 894.6 (dated Nov. 30, 2017).
Zhang, "Study and Implementation of Streaming Media AAA System based on Linux," Chinese Masters Thesis, Databased Information Science and Technology, pp. 54-55, 65-66 (Jul. 15, 2005).

* cited by examiner

| SERVER ID | FUNCTIONS | LOAD | AVAILABLE CAPACITY | CAPACITY | RELATED SESSIONS / IPs | RELATED PEER GROUPS |
|---|---|---|---|---|---|---|
| DA-MP1 | A, B, C | 90 | 10 | 100 | IP1-IP3, IP4, IP5-IP8 | 1, 2, 3 |
| DA-MP2 | A, B, C | 90 | 10 | 100 | IP1-IP3, IP4, IP5-IP8 | 1, 2, 3 |
| DA-MP3 | A, B, C | 90 | 10 | 100 | IP1-IP3, IP4, IP5-IP8 | 1, 2, 3 |
| DA-MP4 | A, C | 20 | 80 | 100 | IP1-IP3, IP5-IP8 | 1, 3 |

METHODS, SYSTEMS, AND COMPUTER READABLE MEDIA FOR PEER AWARE LOAD DISTRIBUTION

TECHNICAL FIELD

The subject matter described herein relates to load distribution. More specifically, the subject matter relates to methods, systems, and computer readable media for peer aware load distribution.

BACKGROUND

The Diameter protocol is a next generation authentication, authorization, and accounting (AAA) protocol. The Diameter base protocol is defined in IETF RFC 6733, the disclosure of which is incorporated by reference herein in its entirety. Commonly used within the Internet multimedia subsystem (IMS) architecture, the Diameter protocol was derived from the remote authentication dial-in user service (RADIUS) protocol. Historically, the RADIUS protocol was employed by Internet service providers (ISPs) to provide a secure communication channel between an ISP's access server and a secure location where user credential information was stored, e.g., a lightweight directory access protocol (LDAP) server. While the RADIUS protocol provided a standardized AAA exchange protocol, the emergence of new technologies and applications necessitated the development of a protocol capable of meeting ever-changing demands. Diameter aims to extend the standardized approach of RADIUS while providing expanded functionality and remaining open to future development.

The above-referenced Diameter RFC does not specify a method for load (e.g., connections) distribution when a Diameter element includes a distributed architecture. Accordingly, a need exists for methods, systems, and computer readable media for peer aware load distribution.

SUMMARY

Methods, systems, and computer readable media for peer aware load distribution are disclosed. According to one method, the method includes steps occurring at a Diameter signaling router (DSR) comprising a plurality of message processors. The method also includes receiving Diameter messages associated with two or more Diameter sessions, wherein each of the two or more Diameter sessions is associated with a first peer group and assigning, using the first peer group and a peer aware load distribution algorithm, the two or more Diameter sessions to two or more message processors of the plurality of message processors, wherein the peer aware load distribution algorithm distributes Diameter sessions associated with the first peer group among the two or more message processors for avoiding a single point of failure.

According to one system, the system includes a DSR comprising a plurality of message processors and a load balancer. The load balancer is configured to receive Diameter messages associated with two or more Diameter sessions, wherein each of the two or more Diameter sessions is associated with a first peer group and to assign, using the first peer group and a peer aware load distribution algorithm, the two or more Diameter sessions to two or more message processors of the plurality of message processors, wherein the peer aware load distribution algorithm distributes Diameter sessions associated with the first peer group among the two or more message processors for avoiding a single point of failure.

The subject matter described herein may be implemented in software in combination with hardware and/or firmware. For example, the subject matter described herein may be implemented in software executed by a processor. In some implementations, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the term "load" refers to computational work or processing performable by an entity. For example, load may include or refer to Diameter connections, traffic, messages, transactions, or sessions that are assigned to and/or processed by Diameter message processors.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for peer aware load distribution. Generally, load balancing algorithms in Diameter networks tend to distribute Diameter traffic without regard to "user defined functionality". Moreover, such algorithms tend to distribute Diameter traffic to a least loaded message processor (e.g., application server) regardless of whether such distribution would result in a single point of failure for one or more services or functions. While distributing Diameter traffic to a least loaded message processor may generally be beneficial, issues can arise in certain circumstances. For example, if all of the Diameter traffic associated with a Diameter network node that provides a particular function is distributed to one message processor, then if this message processor fails the traffic associated with this Diameter network node will not be processed. Hence, in this example, the message processor becomes a single point of failure that can significantly impact the network and its users.

In accordance with some aspects of the subject matter described herein, techniques, methods, or mechanisms are disclosed for associating similar Diameter entities into peer groups for load distribution purposes. For example, a peer group may include all call session control functions (CSCFs) in a network. In this example, when distributing Diameter traffic associated with the peer group, the Diameter traffic can be distributed among multiple message processors such that a single point of failure does not take down all CSCF related processing in the network, thereby enhancing features, reliability, and load distribution.

In accordance with some aspects of the subject matter described herein, techniques, methods, or mechanisms are disclosed for peer aware load distribution utilizing peer groups and/or user defined criteria. For example, a peer aware load distribution algorithm may consider not only relative load associated with each message processor, but also a peer group associated with the Diameter traffic when determining how to distribute the Diameter traffic. In this example, the peer aware distribution algorithm may be usable to determine multiple message processors for handling the Diameter traffic for the particular peer group.

Advantageously, in accordance with some aspects of the subject matter described herein, by using peer groups for load distribution purposes, similar Diameter traffic (e.g., from similar Diameter entities) can be distributed among the available message processors, which reduces service impacts when one of these message processors becomes unavailable.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
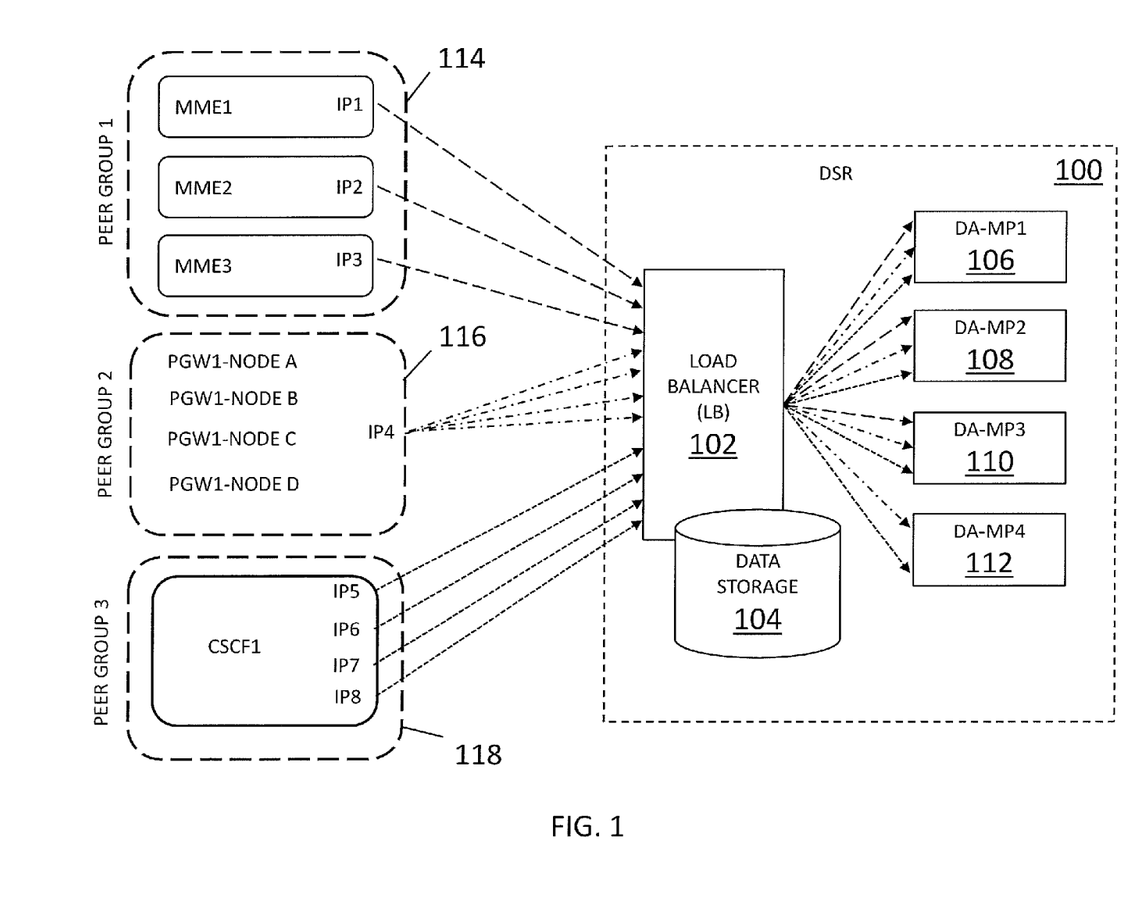
FIG. 1 is a diagram illustrating a Diameter signaling router (DSR) according to an embodiment of the subject matter described herein.

FIG. 1 is a diagram illustrating a Diameter signaling router (DSR) 100 according to an embodiment of the subject matter described herein. DSR 100 may represent any suitable entity for routing or relaying Diameter signaling messages, e.g., between Diameter entities and Diameter servers. For example, DSR 100 may be a long term evolution (LTE) signaling router, an LTE Diameter signaling router, a Diameter signaling agent, a Diameter proxy agent, a Diameter relay agent, a Diameter routing agent, a Diameter translation agent, or a Diameter redirect agent. DSR 100 may include functionality for processing various messages. DSR 100 may include various communications interfaces for communication with Diameter entities, e.g., 3rd Generation Partnership Project (3GPP) LTE communications interfaces and other (e.g., non-LTE) communications interfaces. In some embodiments, receiving, processing, and/or routing functionality may be included in one or more modules. For example, DSR 100 may include or have access to one or more modules for receiving Diameter signaling messages associated with multiple different Diameter signaling interfaces, e.g., S9, S6a, S11, Cx, and Dx.

In some embodiments, Diameter entities may be referred to as Diameter clients and/or Diameter nodes. For example, for a given transaction, a Diameter entity may act as a Diameter client and may request Diameter information or Diameter related processing. In another example, a Diameter entity may act as a Diameter server and may provide Diameter information or Diameter related processing in response to a request.

In some embodiments, DSR 100 may interact with Diameter entities via other Diameter interfaces. For example, DSR 100 may receive Diameter messages via an LTE interlace, an IMS interface, an IETF specification interface, a 3GPP specification interface, a Third Generation Partnership Project 2 (3GPP2) specification interface, a European Telecommunications Standards Institute (ETSI) specification interface, an International Telecommunications Union (ITU) specification interface, a PacketCable specification interface, a MultiService Forum (MSF) specification interface, an Sh interface, a Dx interface, a Ro interface, a Rf interface, an Sp interface, a Gx interface, a Rx interface, a Gz interface, a Gy interface, a Gq interface, a Zh interface, a Dz interface, a Zn interface, a Ty interface, a Tx interface, a Dw interface, a Wa interface, a Wd interface, a Wx interface, a Wm interface, a Wg interface, a Pr interface, a Gr interface, a Gr+ interface, a Gi interface, a Wo interface, a Wf interface, a Re interface, an S6 interface, an S2 interface, an SW interface, an Sta interface, an S7 interface, an H2 interface, an E2 interface, an E4 interface, an E5 interface, a A3 interface, a A4 interface, a Rr interface, a Gq' interface, a TC-6 interface, a TC-7 interface, a TC-8 interface, a TC-9 interface, a TC-10 interface, a TC-11 interface, a DB-0 interface, a DB-2 interface, a BI-1 interface, a LOC-1 interface, an Rw interface, a Pkt-mm-2 interface, a P-CSCF-PAM interface, a Pkt-laes-2 interface, an MM10 interface, an MZ interface, a Gmb interface, or a Zn' interface.

DSR 100 may interact with peer groups 114-118. Each of peer groups 114-118 may represent one or more Diameter entities (e.g., nodes that can communicate using a Diameter protocol) that are logically grouped based on or more criteria. Such criteria may include a same Diameter function, a same time period, a same node, a same computing platform, a same Internet protocol (IP) address, a same Diameter connection, a same Diameter realm, or a same network. For example, peer groups 114-118 may include network nodes, such as mobility management entities (MMEs), packet gateway (PGWs), and/or CSCFs, grouped based on common functionality, a common IP address, a common network operator, or a common geographical location.

In some embodiments, peer groups 114-118 may be assigned by a network operator or using predetermined criteria provided by the network operator. For example, a network operator may assign a group of IP addresses associated with one or more MMEs to peer group 114. In another example, a network operator may assign a number of Diameter entities that perform similar functions (e.g., PGWs) and/or that share a same IP address to peer group 116. In yet another example, a network operator may assign a Diameter node associated with multiple IP addresses to peer group 118.

In some embodiments, peer groups 114-118 may be assigned dynamically. For example, DSR 100 or LB 102 may assign certain Diameter sessions and/or Diameter entities based on various criteria that may change over time. In this example, DSR 100 or LB 102 may assign Diameter sessions and/or Diameter entities to peer groups 114-118 based on network conditions, server failures, time of day, and/or day of week.

DSR 100 may include a load balancer (LB) 102. LB 102 may represent any suitable entity or entities (e.g., software executing on a processor, an application-specific integrated circuit (ASIC), and/or a field-programmable gate array (FPGA)) for performing aspects related to peer aware load (e.g., connections) distribution. In some embodiments, LB 102 may be configured to perform load distribution using various load distribution algorithms and various criteria, e.g., user defined criteria located in parameter fields of Diameter messages. In some embodiments, LB 102 may be an integrated front end or connection distributor, e.g., a DSR integrated front end for balancing connections or load.

LB 102 may include functionality for distributing or assigning Diameter traffic (e.g., messages or related Diameter sessions) to one or more message processors 106-112. In some embodiments, each of message processors 106-112 may be a distinct message processing module of a distributed computing platform, a computing blade in a blade-based distributed computing platform, a processing core element associated with a single or multi-core computing device, or a virtual node instantiated on a single physical computing device.

In some embodiments, DSR 100 may be located in a single distinct geographic location and communicate via an internal communications network, or may include multiple message processors located in geographically diverse locations and may communicate via an external communications network.

In some embodiments, message processors 106-112 may act as Diameter servers and/or application servers. For example, message processor 106 may include functionality for processing certain types of Diameter messages. In this example, message processor 106 may be assigned Diameter messages based, at least in part, on the ability of message processor 106 to receive, process, and/or respond to the Diameter messages.

In some embodiments, DSR 100 and/or LB 102 may utilize a peer aware distribution algorithm that utilizes peer groups and/or other user defined criteria when determining how to distribute Diameter traffic. For example, a peer aware distribution algorithm may represent any software or logic for distributing and/or assigning Diameter messages and/or Diameter sessions to appropriate message processors. In this example, the peer aware distribution algorithm may be usable for determining message processors (e.g., message processors 106-112) to handle Diameter messages and/or Diameter sessions associated with a particular peer group.

In some embodiments, a peer aware distribution algorithm may be usable for distributing Diameter traffic associated with a peer group among a plurality of message processors (e.g., application servers) rather than solely distributing Diameter traffic to a least loaded message processor. Hence, by assigning Diameter traffic associated with that peer group among multiple message processors, a single point of failure is avoided which is beneficial for many networks and users since at least some Diameter traffic associated with the peer group is still capable of being processed even if one message processor goes offline or experiences issues.

In some embodiments, a peer aware distribution algorithm may be usable for distributing Diameter traffic associated with a peer group among a plurality of message processors (e.g., application servers) such that the distribution spreads the risk of failure among multiple message processor while still performing least load distribution. For example, a peer aware distribution algorithm may distribute Diameter traffic to the two least loaded message processors. In another example, a peer aware distribution algorithm may distribute Diameter traffic to multiple message processors, but a least loaded Diameter message processor may receive the majority of the Diameter traffic being distributed.

For example, assume when a CSCF of peer group 3 118 comes online and starts sending Diameter request messages to DSR 100, a number of Diameter sessions have been distributed among message processor 106-110 and, as a result of this distribution, message processor 112 is least loaded of message processors 106-112. In this example, instead of assigning the CSCF related Diameter traffic to message processor 112 until message processor 112 is loaded more similar to message processors 106-110, DSR 100 (and/or LB 102) may determine, using a peer aware load distribution algorithm, to assign the Diameter request messages among message processors 106-112, thereby avoiding a single point of failure for the CSCF related Diameter traffic.

Data storage 104 may represent any suitable entity (e.g., a non-transitory computer readable medium, embedded memory, or a memory device) for storing data associated with performing load distribution. Data storage 104 may store associations between peer groups and message processors (e.g., application servers). Data storage 104 may also include load information and capacity information for message processors 106-112 and/or other information. In some embodiments, data storage 104 may be accessible by LB 102 and other entities and may be usable for various purposes associated with load distribution. In some embodiments, data storage 104 may be located on a single device or computing platform or may be distributed across multiple devices or computing platforms.

It will be appreciated that FIG. 1 is for illustrative purposes and that various nodes, their locations, and/or their functions (e.g., modules) described above in relation to FIG. 1 may be changed, altered, added, or removed. For example, some nodes and/or functions may be combined into a single entity. In another example, some nodes and/or functions may be distributed across multiple nodes and/or platforms.

Figure 2:
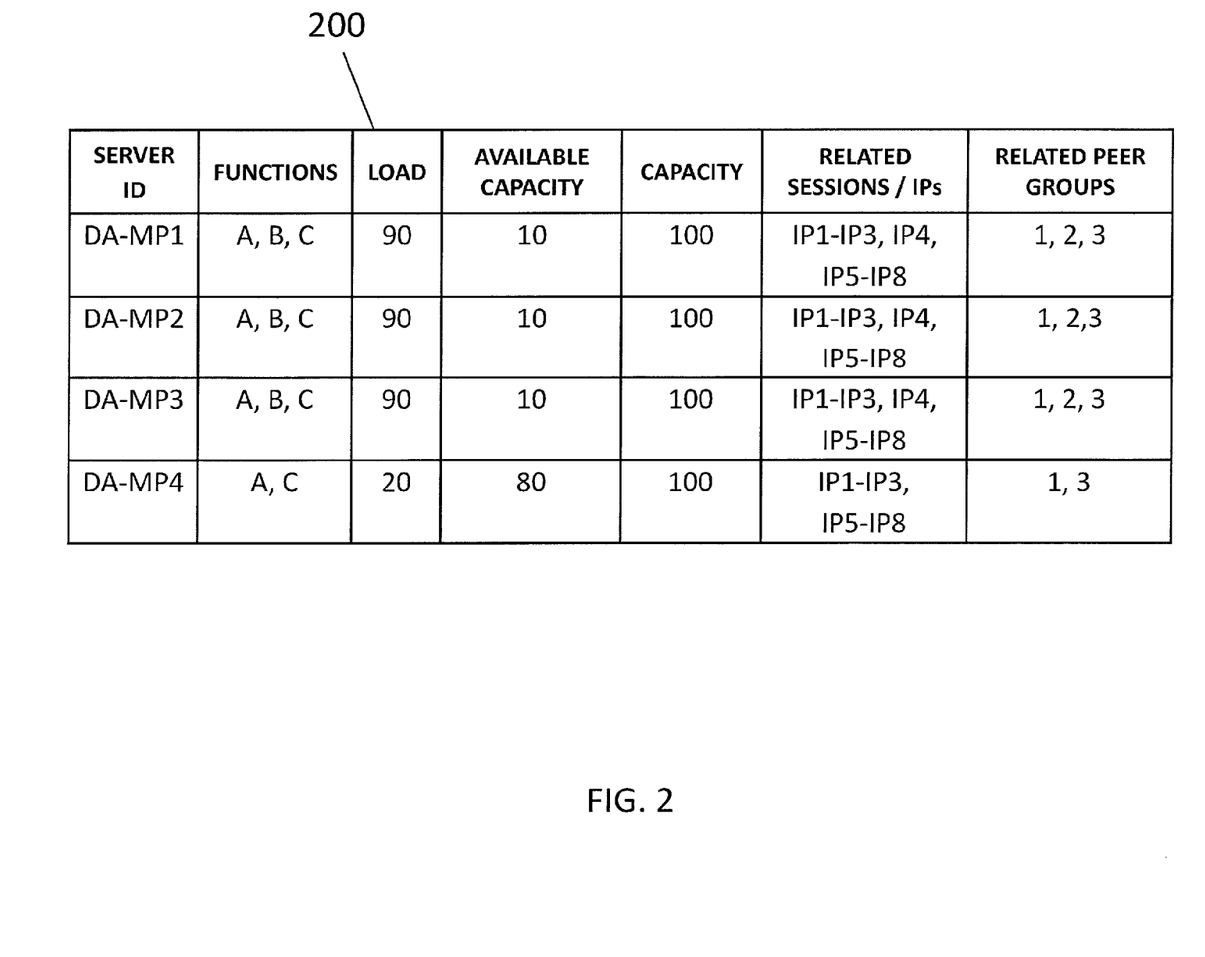
FIG. 2 is a diagram illustrating peer aware load distribution related information according to an embodiment of the subject matter described herein.

FIG. 2 is a diagram illustrating peer aware load distribution related (PALDR) information 200 according to an embodiment of the subject matter described herein. PALDR information 200 may represent any information associated with peer aware load distribution, such as message processor (e.g., server) identifiers, message processor related functions and/or capabilities, load information, available capacity information, capacity information, related (e.g., assigned) sessions and/or IP addresses, and/or related peer groups. In some embodiments, PALDR information 200 may be accessed and/or stored by DSR 100 and/or LB 102. In some embodiments, PALDR information 200 may be stored in data storage 104 using various data structures.

Referring to FIG. 2, PALDR information 200 may include associations between a message processor and related load information and may be depicted using a table. For example, a table representing PALDR information 200 may comprise columns and/or fields for a server identifier, a load, an available capacity, a capacity, related sessions and/or IP addresses, and related peer groups.

A server identifier field may comprise a value, a message processor name, and/or a related identifier for indicating a message processor. For example, each of message processors 106-112 may be associated with a unique uniform resource identifier (URI), a serial number, a media access control (MAC) address, or other identifier.

A functions field may comprise a value, a function name, and/or a related identifier for indicating a function or capability associated with a message processor. For example, each of message processors 106-112 may be associated with some functions (e.g., mobility management, policy rules and charging, authentication, etc.), e.g., represented as 'A', 'B' and/or 'C' in FIG. 2.

A load field may comprise a value and/or a related identifier for indicating a current load associated with a message processor. For example, each of message processors 106-112 may be associated with a load represented as a value between '0'-'100', where the value may indicate a percentage of a total capacity associated with a message processor or may indicate a number of Diameter sessions currently being handled by a message processor.

An available capacity field may comprise a value and/or a related identifier for indicating available capacity associated with a message processor. For example, each of message processors 106-112 may be associated with an available capacity represented as a value between '0'-'100', where the value may indicate a percentage of capacity available for handling additional load or may indicate a number of additional Diameter sessions that can be handled by a message processor.

A capacity field may comprise a value and/or a related identifier for indicating a capacity associated with a message processor. For example, each of message processors 106-112 may be associated with a capacity represented as a value between '0'-'100', where the value may indicate a total number of load or Diameter sessions that may be handled (e.g., concurrently) by a message processor.

A related sessions and/or IP addresses field may comprise one or more values or related identifiers for indicating one or more related sessions or IP addresses associated with a message processor. For example, message processors 106-112 may process different Diameter sessions associated with one or more IP addresses. In this example, message processor 106 may handle Diameter sessions associated with IP addresses 'IP1' and message processor 112 may handle Diameter sessions associated with IP addresses 'IP8'. In another example, message processor 106 may handle a Diameter session '567' associated with IP addresses 'IP1' and message processor 108 may handle a Diameter session '8922' associated with IP addresses 'IP1'.

A related peer group field may comprise one or more values or related identifiers for indicating one or more related peer groups associated with a message processor. For example, message processors 106-112 may handle Diameter messages associated with one or more peer groups depending on available capacity and/or functions to be performed. In this example, message processor 106 may handle Diameter sessions associated with peer groups '1', '2', '3' and message processor 112 may handle Diameter sessions associated with peer groups '1' and '3'.

It will also be appreciated that PALDR information 200 is for illustrative purposes and that different and/or additional data than the data depicted in FIG. 2 may be usable for peer aware load distribution. Further, PALDR information 200 may be stored or managed using various data structures and/or computer readable media.

Figure 3:
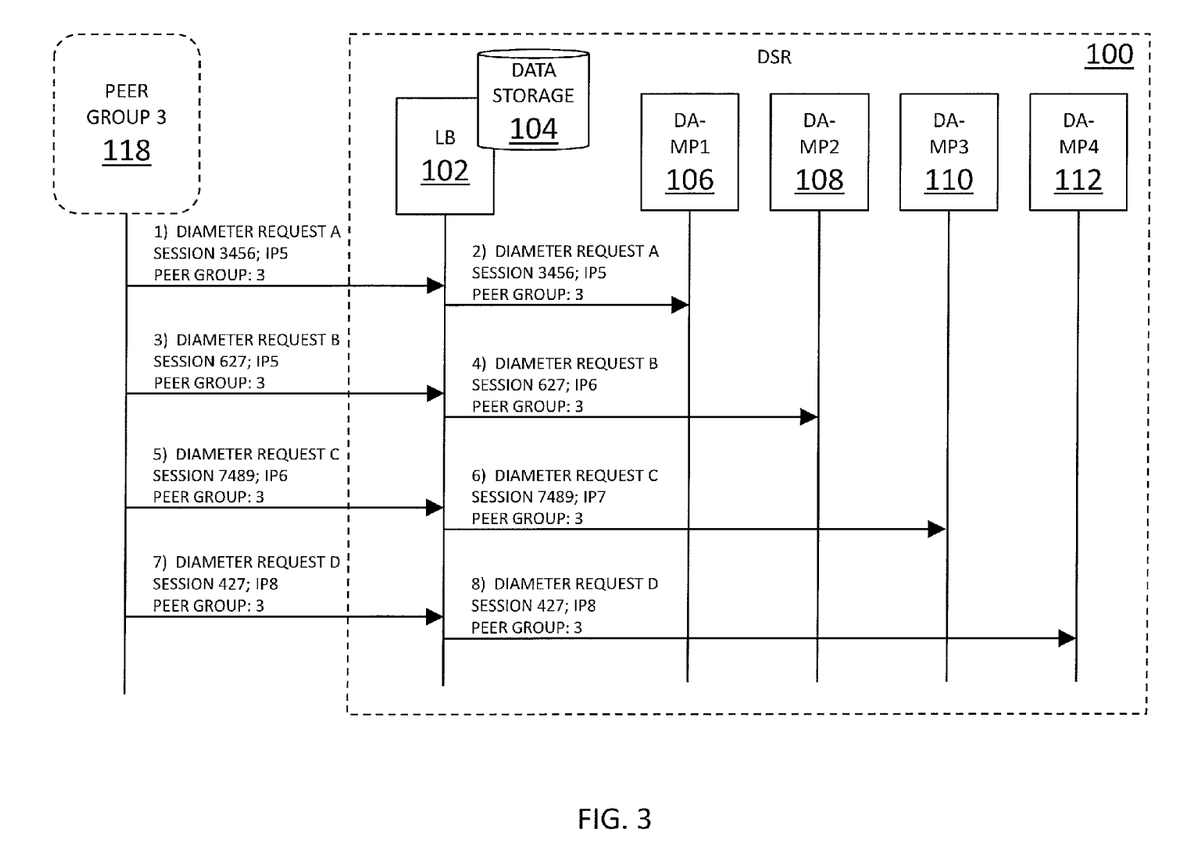
FIG. 3 is a diagram illustrating assigning Diameter sessions associated with a peer group among multiple message processors according to an embodiment of the subject matter described herein.

FIG. 3 is a diagram illustrating assigning Diameter sessions associated with a peer group among multiple message processors according to an embodiment of the subject matter described herein. In contrast to load distribution algorithms that assigns Diameter sessions to message processors that are least loaded (e.g., least loaded relative to their capacity), DSR 100 and/or LB 102 may be configured to utilize peer groups and other PALDR information 200 (e.g., in addition to load information) when determining load distribution.

In some embodiments, DSR 100, LB 102, and/or a peer aware load distribution algorithm may be designed to avoid single points of failure. In such embodiments, the peer aware load distribution algorithm may distribute Diameter sessions from peer group 3 118 among multiple message processors regardless of whether these message processors have greater relative loads than other message processors. By distributing load among multiple message processors, a least loaded message processor may not receive all Diameter sessions associated with a given peer group, thereby avoiding a single point of failure.

For example, assuming PALDR information 200 depicted in FIG. 2, DSR 100 (and/or LB 102) may determine that message processor 112 is least loaded of message processors 106-112. However, instead of assigning all new Diameter session requests to message processor 112 until message processor 112 is loaded more similar to message processors 106-110, DSR 100 (and/or LB 102) may determine, using a peer aware load distribution algorithm, to assign new Diameter session requests associated with a particular peer group among message processors 106-112.

Referring to FIG. 3, peer group 3 118 may represent one or more Diameter entities associated with a particular network and/or location. In some embodiments, peer group 3 118 may also be associated with a Diameter entity associated with one or more IP addresses, such as IP5-IP8. For example, peer group 118 may include a CSCF sending Diameter request messages for requesting various Diameter information and/or related Diameter processing from one or more of message processors 106-112.

In step 1, a Diameter request message 'A' may be sent from peer group 3 118 to LB 102. Diameter request message 'A' may include a peer group identifier and various other identifiers, such as a session identifier '3456' and an origination IP address 'IP5'.

In some embodiments, after receiving Diameter request message 'A', LB 102 may determine, e.g., using PALDR information 200, whether Diameter request message 'A' or a related session is already assigned to a message processor. If so, LB 102 may send Diameter request message 'A' to the appropriate message processor. If Diameter request message 'A' is not already assigned a message processor, LB 102 may utilize a peer aware load distribution algorithm which considers, among other things, a peer group associated with Diameter request message 'A'.

In some embodiments, DSR 100 and/or LB 102 may determine, using a peer aware load distribution algorithm, that Diameter request message 'A' and/or related Diameter session '3456' is to be assigned to message processor 106.

In some embodiments, DSR 100 and/or LB 102 may assign, using a peer aware load distribution algorithm, all Diameter request messages or Diameter sessions originating from IP address 'IP5' to message processor 106.

In step 2, Diameter request message 'A' may be sent from LB 102 to message processor 106. For example, message processor 106 may receive and process Diameter request message 'A' then respond with a Diameter response message.

In step 3, a Diameter request message 'B' may be sent from peer group 3 118 to LB 102. Diameter request message 'B' may include a peer group identifier and various other identifiers, such as a session identifier '627' and an origination IP address 'IP6'.

In some embodiments, after receiving Diameter request message 'B', LB 102 may determine, e.g., using PALDR information 200, whether Diameter request message 'B' or a related session is already assigned to a message processor. If so, LB 102 may send Diameter request message 'B' to the appropriate message processor. If Diameter request message 'B' is not already assigned a message processor, LB 102 may utilize a peer aware load distribution algorithm which considers, among other things, a peer group associated with Diameter request message 'B'.

In some embodiments, DSR 100 and/or LB 102 may determine, using a peer aware load distribution algorithm, that Diameter request message 'B' and/or related Diameter session '627' is to be assigned to message processor 108.

In some embodiments, DSR 100 and/or LB 102 may assign, using a peer aware load distribution algorithm, all Diameter request messages or Diameter sessions originating from IP address 'IP6' to message processor 108.

In step 4, Diameter request message 'B' may be sent from LB 102 to message processor 108. For example, message processor 108 may receive and process Diameter request message 'B' then respond with a Diameter response message.

In step 5, a Diameter request message 'C' may be sent from peer group 3 118 to LB 102. Diameter request message 'C' may include a peer group identifier and various other identifiers, such as a session identifier '7489' and an origination IP address 'IP7'.

In some embodiments, after receiving Diameter request message 'C', LB 102 may determine, e.g., using PALDR information 200, whether Diameter request message 'C' or a related session is already assigned to a message processor. If so, LB 102 may send Diameter request message 'C' to the appropriate message processor. If Diameter request message 'C' is not already assigned a message processor, LB 102 may utilize a peer aware load distribution algorithm which considers, among other things, a peer group associated with Diameter request message 'C'.

In some embodiments, DSR 100 and/or LB 102 may determine, using a peer aware load distribution algorithm, that Diameter request message 'C' and/or related Diameter session '7489' is to be assigned to message processor 110.

In some embodiments, DSR 100 and/or LB 102 may assign, using a peer aware load distribution algorithm, all Diameter request messages or Diameter sessions originating from IP address 'IP7' to message processor 110.

In step 6, Diameter request message 'C' may be sent from LB 102 to message processor 110. For example, message processor 110 may receive and process Diameter request message 'C' then respond with a Diameter response message.

In step 7, a Diameter request message 'D' may be sent from peer group 3 118 to LB 102. Diameter request message 'D' may include a peer group identifier and various other identifiers, such as a session identifier '427' and an origination IP address 'IP8'.

In some embodiments, after receiving Diameter request message 'D', LB 102 may determine, e.g., using PALDR information 200, whether Diameter request message 'D' or a related session is already assigned to a message processor. If so, LB 102 may send Diameter request message 'D' to the appropriate message processor. If Diameter request message 'D' is not already assigned a message processor, LB 102 may utilize a peer aware load distribution algorithm which considers, among other things, a peer group associated with Diameter request message 'D'.

In some embodiments, DSR 100 and/or LB 102 may determine, using a peer aware load distribution algorithm, that Diameter request message 'D' and/or related Diameter session '427' is to be assigned to message processor 106.

In some embodiments, DSR 100 and/or LB 102 may assign, using a peer aware load distribution algorithm, all Diameter request messages or Diameter sessions originating from IP address 'IP8' to message processor 112.

In step 8, Diameter request message 'D' may be sent from LB 102 to message processor 112. For example, message processor 112 may receive and process Diameter request message 'D' then respond with a Diameter response message.

It will be appreciated that FIG. 3 is for illustrative purposes and that additional and/or different steps than those depicted in FIG. 3 can be usable for performing metadata-driven data collection. Additionally, it will be appreciated that steps depicted in FIG. 3 can occur in a different order than depicted or can be combined.

Figure 4:
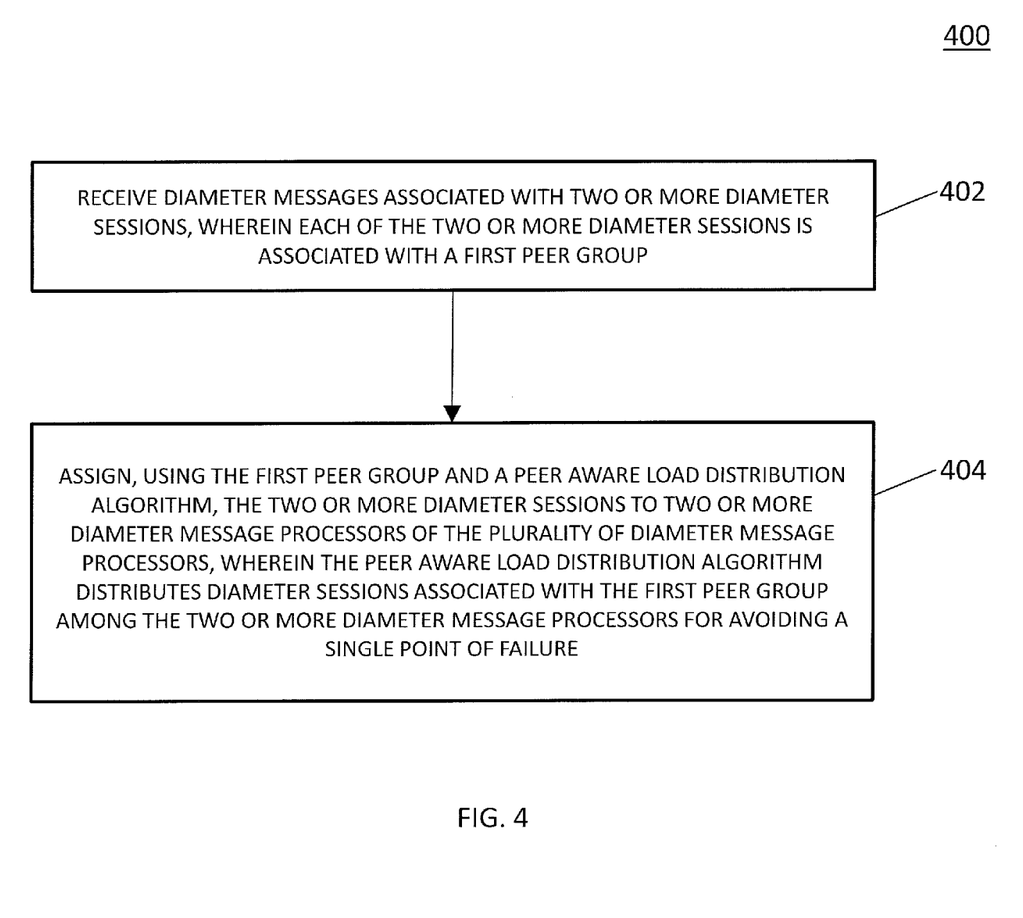
FIG. 4 is a diagram illustrating a process for peer aware load distribution according to an embodiment of the subject matter described herein.

FIG. 4 is a diagram illustrating a process 400 for peer aware load distribution according to an embodiment of the subject matter described herein. In some embodiments, process 400, or portions thereof (e.g., steps 402 and/or 404, may be performed by or at DSR 100, LB 102, and/or another node or module.

Referring to process 400, in step 402, Diameter messages associated with two or more Diameter sessions may be received, where each of the two or more Diameter sessions may be associated with a first peer group.

In step 404, the two or more Diameter sessions may be assigned, using the first peer group and a peer aware load distribution algorithm, to two or more message processors of a plurality of message processors, where the peer aware load distribution algorithm distributes Diameter sessions associated with the first peer group among the two or more message processors for avoiding a single point of failure.

In some embodiments, one message processor may be least loaded of a plurality of message processors. For example, when DSR 100 assigns Diameter sessions associated with a peer group to multiple message processors, a least loaded message processor (e.g., one message processor having less load relative to the other message processor(s) in a group) may be utilized.

In some embodiments, two or more Diameter sessions may be assigned to two or more message processors regardless of whether the two or more message processors are least loaded of a plurality of message processors. For example, when DSR 100 assigns Diameter sessions associated with a peer group to multiple message processors, a message processor that is not a least loaded message processor available may be utilized.

In some embodiments, a peer group may indicate a group of Diameter entities (e.g., one or more Diameter entities) associated with a same Diameter function, a same time period, a same node, a same computing platform, a same IP address, a same Diameter connection, a same Diameter realm, or a same network. For example, all Diameter entities (e.g., nodes or software executing on a processor in one or more nodes) associated with a same IP address may be associated with a same peer group. In another example, all CSCFs associated with a particular network or network operator may be associated with a same peer group. In yet another example, all MMEs within a geographical location may be associated with a same peer group. In yet another example, all Diameter entities attempting to establish a new Diameter session within a same five minute period (e.g., during a half-time show of a major sporting event) may be associated with a same peer group.

In some embodiments, two or more Diameter sessions (e.g., assigned to message processors) may be associated with one or more IP addresses. For example, different Diameter sessions may be associated with a same origination IP address. In another example, different Diameter sessions may be associated with different IP addresses.

In some embodiments, one or more peer groups may be assigned by a network operator or DSR 100. For example, a network operator may group Diameter entities based on predefined rules and/or criteria. In another example, DSR 100 may group Diameter client based on predefined criteria and/or dynamically based on current network conditions.

In some embodiments, a plurality of message processors may be interconnected via either an internal communications network or an external communications network. For example, message processors 106-112 may be connected via an internal communications bus or via an external Ethernet network.

In some embodiments, a message processor may comprise a distinct message processing module of a distributed computing platform, a computing blade in a blade-based distributed computing platform, a processing core element associated with a single or multi-core computing device, an application server, or a virtual node instantiated on a single physical computing device.

It will be appreciated that process 400 is for illustrative purposes and that different and/or additional actions may be used. It will also be appreciated that various actions described herein may occur in a different order or sequence.

It should be noted that DSR 100, LB 102, and/or functionality described herein may constitute a special purpose computing device. Further, DSR 100, LB 102, and/or functionality described herein can improve the technological field of Diameter communications by providing mechanisms for distributing Diameter traffic (e.g., messages, connections, and/or sessions) among a plurality of message processors (e.g., application servers) rather than solely distributing Diameter traffic to a least loaded message processor, thereby avoiding a single point of failure. Further, DSR 100, LB 102, and/or functionality described herein can improve the technological field of load distribution (e.g., load sharing or load balancing) by utilizing a load distribution algorithm that considers, in addition to load information about available message processors, user-defined criteria, such as peer groups. By utilizing peer groups when distributing Diameter traffic, Diameter traffic from a peer group (e.g., a group of Diameter entities associated with one or more common IP addresses) can be distributed among available servers as evenly as possible, thereby reducing service impacts associated with the peer group when one of the application servers becomes unavailable.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as group forth hereinafter.

What is claimed is:

1. A method for peer aware load distribution, the method comprising:
   at a Diameter signaling router (DSR) comprising a plurality of message processors:
   receiving Diameter messages for initiating two or more Diameter sessions, wherein each of the two or more Diameter sessions is associated with a first peer group, wherein the Diameter messages originate from members of the first peer group; and
   assigning, using the first peer group and a peer aware load distribution algorithm, the two or more Diameter sessions to two or more message processors of the plurality of message processors, wherein the peer aware load distribution algorithm distributes the two or more Diameter sessions associated with the first peer group among the two or more message processors for avoiding a single point of failure, wherein prior to assigning at least one of the two or more Diameter sessions, one message processor was processing all active Diameter sessions associated with the first peer group.

2. The method of claim 1 wherein one of the two or more message processors is least loaded of the plurality of message processors.

3. The method of claim 1 wherein the two or more Diameter sessions are assigned to the two or more message processors regardless of whether the two or more message processors are least loaded of the plurality of message processors.

4. The method of claim 1 wherein the first peer group indicates a group of Diameter entities associated with a same Diameter function, a same time period, a same node, a same computing platform, a same Internet protocol (IP) address, a same Diameter connection, a same Diameter realm, or a same network.

5. The method of claim 1 wherein the two or more Diameter sessions are associated with one or more Internet protocol (IP) addresses.

6. The method of claim 1 wherein one or more peer groups are assigned by a network operator or the DSR.

7. The method of claim 1 wherein the plurality of message processors are interconnected via either an internal communications network or an external communications network.

8. The method of claim 1 wherein at least one of the plurality of message processors comprises:
   a distinct message processing module of a distributed computing platform;
   a computing blade in a blade-based distributed computing platform;
   a processing core element associated with a single or multi-core computing device;
   an application server; or
   a virtual node instantiated on a single physical computing device.

9. A system for peer aware load distribution, the system comprising:
   a Diameter signaling router (DSR) implemented using at least one physical computing platform, wherein the at least one physical computing platform including:
   a processor;
   a memory;
   a plurality of message processors; and
   a load balancer implemented using the processor and the memory, the load balancer configured to receive Diameter messages for initiating two or more Diameter sessions, wherein each of the two or more Diameter sessions is associated with a first peer group, wherein the Diameter messages originate from members of the first peer group; and to assign, using the first peer group and a peer aware load distribution algorithm, the two or more Diameter sessions to two or more message processors of the plurality of message processors, wherein the peer aware load distribution algorithm distributes the two or more Diameter sessions associated with the first peer group among the two or more message processors for avoiding a single point of failure, wherein prior to assigning at least one of the two or more Diameter sessions, one message processor was processing all active Diameter sessions associated with the first peer group.

10. The system of claim 9 wherein one of the two or more message processors is least loaded of the plurality of message processors.

11. The system of claim 9 wherein the load balancer is configured to assign the two or more Diameter sessions to the two or more message processors regardless of whether the two or more message processors are least loaded of the plurality of message processors.

12. The system of claim 9 wherein the two or more Diameter sessions are associated with one or more Internet protocol (IP) addresses.

13. The system of claim 9 wherein the first peer group indicates a group of Diameter entities associated with a same Diameter function, a same time period, a same node, a same computing platform, a same Internet protocol (IP) address, a same Diameter connection, a same Diameter realm, or a same network.

14. The system of claim 9 wherein one or more peer groups are assigned by a network operator or the DSR.

15. The system of claim 9 wherein the plurality of message processors are interconnected via either an internal communications network or an external communications network.

16. The system of claim 9 wherein at least one of the plurality of message processors comprises:
- a distinct message processing module of a distributed computing platform;
- a computing blade in a blade-based distributed computing platform;
- a processing core element associated with a single or multi-core computing device;
- an application server; or
- a virtual node instantiated on a single physical computing device.

17. A non-transitory computer readable medium comprising computer executable instructions that when executed by a processor of a computer control the computer to perform steps comprising:
at a Diameter signaling router (DSR) comprising a plurality of message processors:
receiving Diameter messages for initiating two or more Diameter sessions, wherein each of the two or more Diameter sessions is associated with a first peer group, wherein the Diameter messages originate from members of the first peer group; and
assigning, using the first peer group and a peer aware load distribution algorithm, the two or more Diameter sessions to two or more message processors of the plurality of message processors, wherein the peer aware load distribution algorithm distributes the two or more Diameter sessions associated with the first peer group among the two or more message processors for avoiding a single point of failure, wherein prior to assigning at least one of the two or more Diameter sessions, one message processor was processing all active Diameter sessions associated with the first peer group.

18. The non-transitory computer readable medium of claim 17 wherein one of the two or more message processors is least loaded of the plurality of message processors.

19. The non-transitory computer readable medium of claim 17 wherein the two or more Diameter sessions are assigned to the two or more message processors regardless of whether the two or more message processors are least loaded of the plurality of message processors.

20. The non-transitory computer readable medium of claim 17 wherein the first peer group indicates a group of Diameter entities associated with a same Diameter function, a same time period, a same node, a same computing platform, a same Internet protocol (IP) address, a same Diameter connection, a same Diameter realm, or a same network.

* * * * *

UNITED STATES PATENT AND TRADEMARK OFFICE
CERTIFICATE OF CORRECTION

| | |
|---|---|
| PATENT NO. | : 10,027,577 B2 |
| APPLICATION NO. | : 14/813072 |
| DATED | : July 17, 2018 |
| INVENTOR(S) | : Karandikar et al. |

It is certified that error appears in the above-identified patent and that said Letters Patent is hereby corrected as shown below:

On the Title Page

On page 2, Column 2, under Other Publications, Line 5, delete "Repot" and insert -- Report --, therefor.

On page 3, Column 2, under Other Publications, Line 11, delete "MPT" and insert -- MTP --, therefor.

On page 3, Column 2, under Other Publications, Line 25, delete "LTE:" and insert -- LTE; --, therefor.

On page 4, Column 1, under Other Publications, Line 1, delete "10/993,733" and insert -- 10/993,738 --, therefor.

In the Specification

In Column 4, Line 7, delete "interlace," and insert -- interface, --, therefor.

Signed and Sealed this
Ninth Day of April, 2019

Andrei Iancu
*Director of the United States Patent and Trademark Office*